US011722170B2

(12) United States Patent
Taherzadeh Boroujeni et al.

(10) Patent No.: US 11,722,170 B2
(45) Date of Patent: Aug. 8, 2023

(54) FREQUENCY-HOPPING WITH ZERO OFFSET FOR INDICATION OF NO JOINT CHANNEL ESTIMATION

(71) Applicant: QUALCOMM Incorporated, San Diego, CA (US)

(72) Inventors: Mahmoud Taherzadeh Boroujeni, San Diego, CA (US); Peter Gaal, San Diego, CA (US); Hung Dinh Ly, San Diego, CA (US); Gokul Sridharan, Sunnyvale, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/651,035

(22) Filed: Feb. 14, 2022

(65) Prior Publication Data
US 2022/0321167 A1     Oct. 6, 2022

Related U.S. Application Data

(60) Provisional application No. 63/171,463, filed on Apr. 6, 2021.

(51) Int. Cl.
*H04B 1/7156* (2011.01)
*H04B 1/7136* (2011.01)

(52) U.S. Cl.
CPC ......... *H04B 1/7156* (2013.01); *H04B 1/7136* (2013.01); *H04B 2001/71563* (2013.01); *H04B 2001/71566* (2013.01)

(58) Field of Classification Search
CPC .... H04B 1/713; H04B 1/7136; H04B 1/7156; H04B 2001/7156; H04B 2001/71563; H04B 2001/71566

USPC ......... 375/132–134; 370/330, 335, 337, 342, 370/344, 347
See application file for complete search history.

(56) References Cited

U.S. PATENT DOCUMENTS

| | | | |
|---|---|---|---|
| 2013/0176868 A1* | 7/2013 | Gaal | H04B 7/0404 370/252 |
| 2020/0059868 A1* | 2/2020 | Yang | H04W 76/15 |
| 2020/0389204 A1* | 12/2020 | Matsumura | H04L 5/0044 |
| 2021/0368534 A1* | 11/2021 | Sato | H04W 72/1268 |
| 2023/0034062 A1* | 2/2023 | Wei | H04B 1/713 |

FOREIGN PATENT DOCUMENTS

| | | | | |
|---|---|---|---|---|
| CN | 1864342 A | * | 11/2006 | H04B 1/715 |
| CN | 106455097 A | * | 2/2017 | H04W 72/0446 |
| WO | WO-2021188893 A1 | * | 9/2021 | |

* cited by examiner

*Primary Examiner* — Young T. Tse
(74) *Attorney, Agent, or Firm* — Procopio, Cory, Hargreaves & Savitch LLP

(57) ABSTRACT

Aspects presented herein may enable a UE to determine whether phase continuity is to be maintained for one or more uplink transmissions when the UE is configured with a frequency-hopping with zero frequency offset. In one aspect, a UE receives, from a network entity, an indication of frequency hopping with zero frequency offset. The UE determines whether phase continuity is to be applied to UL transmissions based on the indication of the frequency hopping with zero frequency offset. The UE transmits, to the network entity, at least one uplink channel with no phase continuity based on the determination to not apply phase continuity to the UL transmissions.

30 Claims, 12 Drawing Sheets

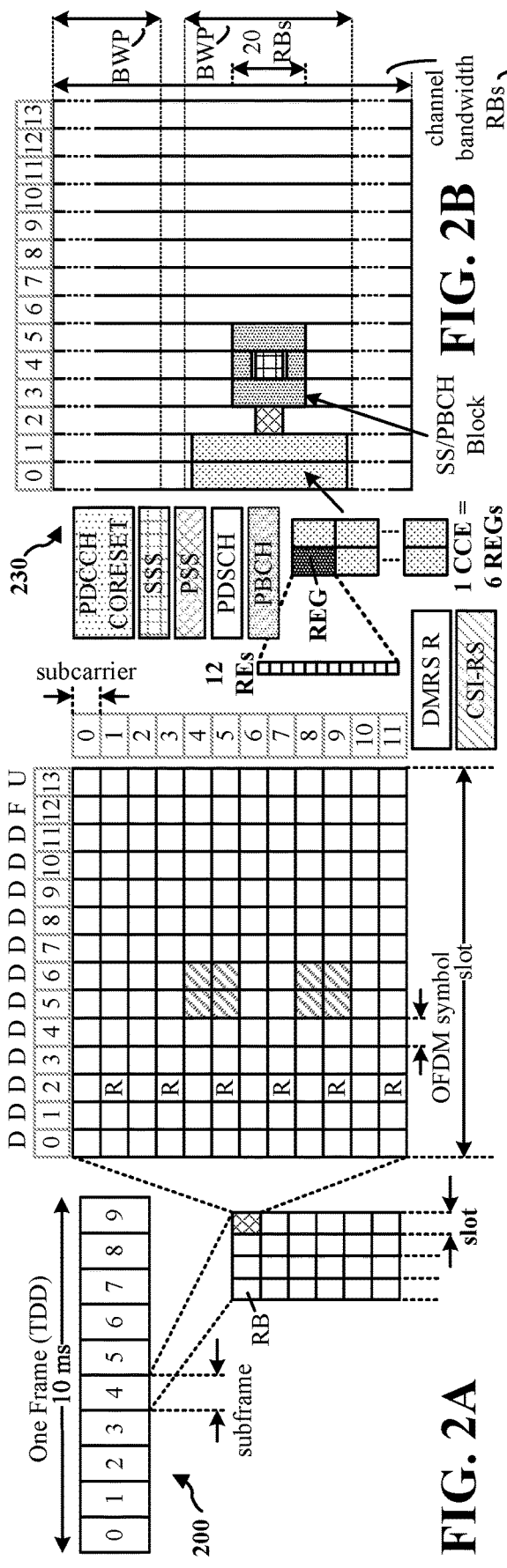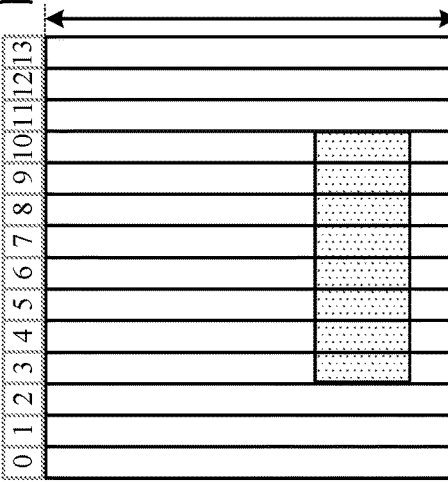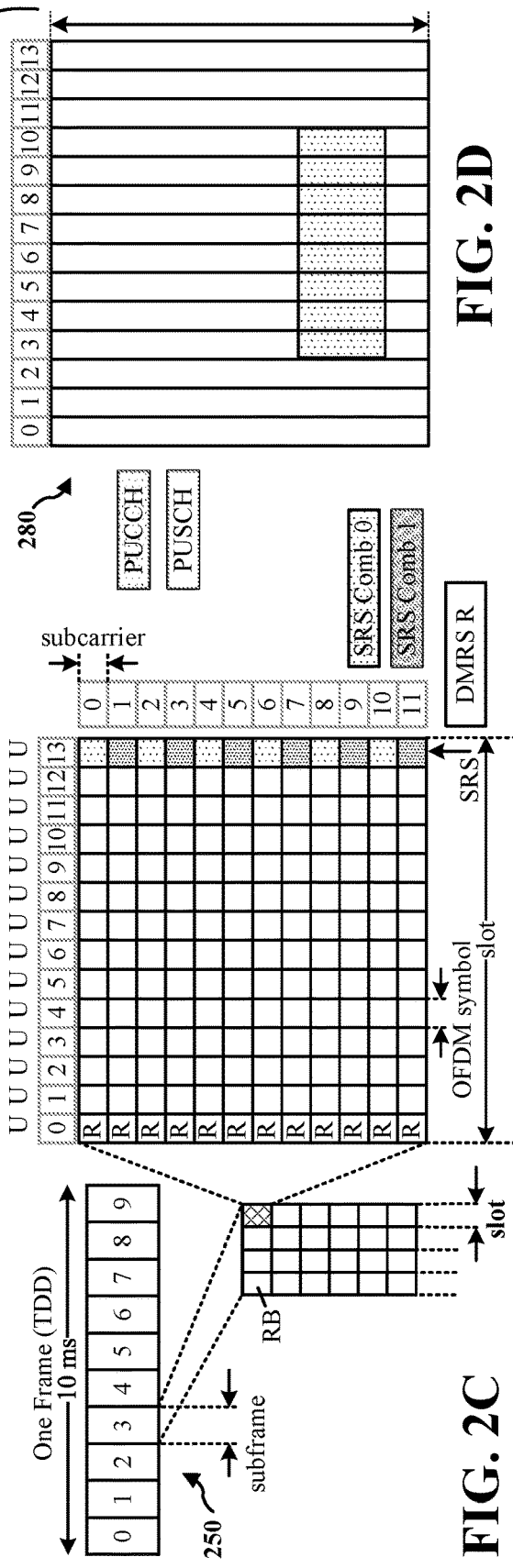
FIG. 2A  FIG. 2B  FIG. 2C  FIG. 2D

FREQUENCY-HOPPING WITH ZERO OFFSET FOR INDICATION OF NO JOINT CHANNEL ESTIMATION

CROSS REFERENCE TO RELATED APPLICATION(S)

This application claims the benefit of and priority to U.S. Provisional Application Ser. No. 63/171,463, entitled "FREQUENCY-HOPPING WITH ZERO OFFSET FOR INDICATION OF NO JOINT CHANNEL ESTIMATION" and filed on Apr. 6, 2021, which is expressly incorporated by reference herein in its entirety.

TECHNICAL FIELD

The present disclosure relates generally to communication systems, and more particularly, to wireless communication involving frequency-hopping with zero frequency offset.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives, from a network entity, an indication of frequency hopping with zero frequency offset. The apparatus determines whether phase continuity is to be applied to uplink (UL) transmissions based on the indication of the frequency hopping with zero frequency offset. The apparatus transmits, to the network entity, at least one uplink channel with no phase continuity based on the determination to not apply phase continuity to the UL transmissions.

In an aspect of the disclosure, a method, a computer-readable medium, and an apparatus are provided for wireless communication at a network entity (e.g., a base station or a component of a base station). The apparatus determines phase continuity is not to be applied to UL transmissions from a UE. The apparatus transmits, to the UE based on the determination, an indication of frequency hopping with zero frequency offset. The apparatus receives, from the UE, at least one uplink channel with no phase continuity based on the indication of frequency hopping with zero frequency offset.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
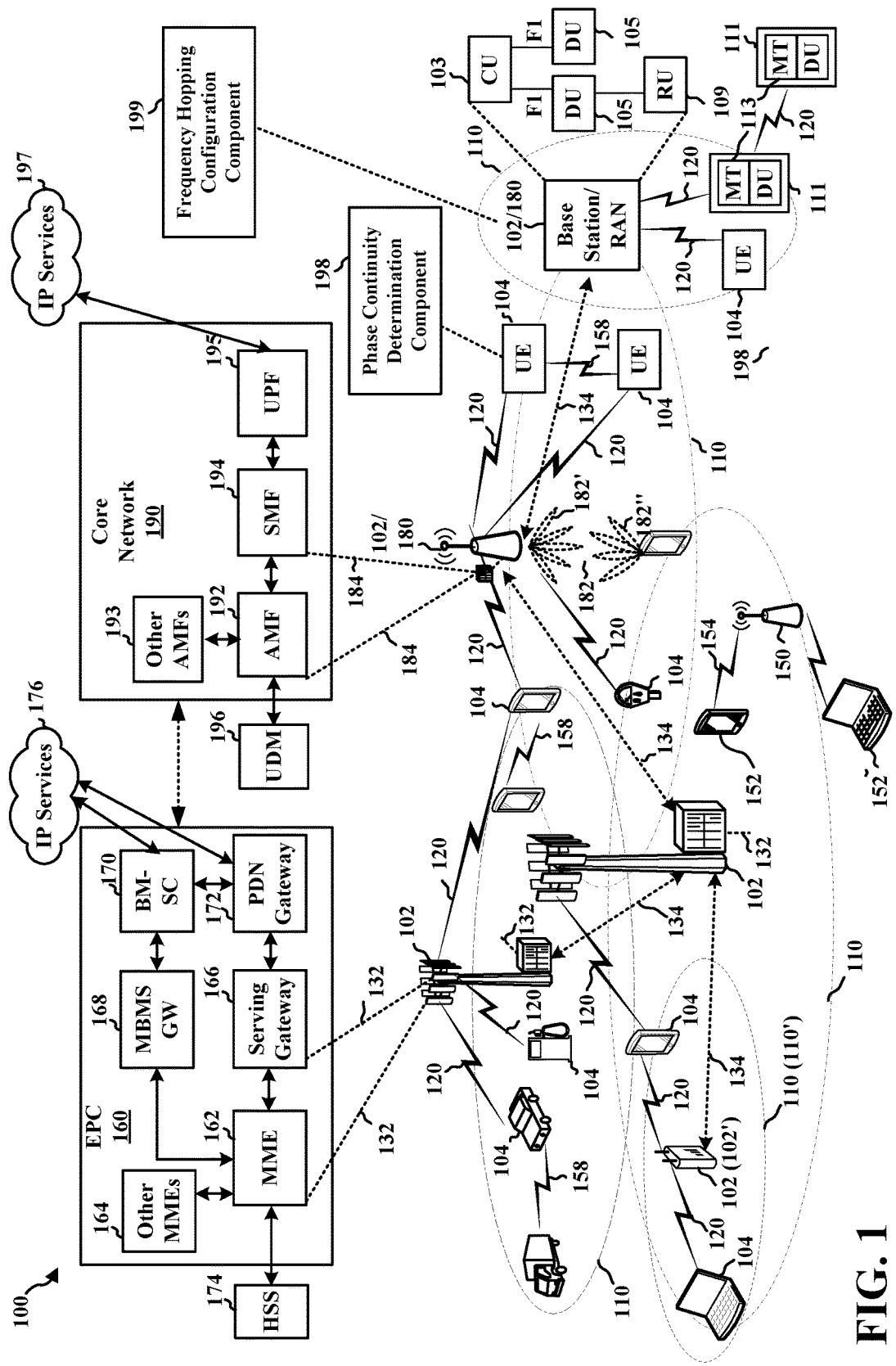
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may enable a receiving device to indicate to a transmitting device that DMRS bundling (or joint channel estimation) is not to be performed or expected at the receiving device based on an indication for a frequency offset that is to be applied to frequency hopping at the transmitting device.

In certain aspects, the UE 104 may include a phase continuity determination component 198 configured to determine whether phase continuity is expected or is to be maintained for one or more UL transmissions when the UE 104 is configured with a frequency-hopping with zero frequency offset. In one configuration, the phase continuity determination component 198 may be configured to receive, from a network entity, an indication of frequency hopping with zero frequency offset. In such configuration, the phase continuity determination component 198 may determine whether phase continuity is to be applied to UL transmissions based on the indication of the frequency hopping with zero frequency offset. In such configuration, the phase continuity determination component 198 may transmit, to the network entity, at least one uplink channel with no phase continuity based on the determination to not apply phase continuity to the UL transmissions.

In certain aspects, the base station 102/180 (or a component of the base station 102/180 or a network entity) may include a frequency hopping configuration component 199 configured to indicate to a UE that phase continuity is not expected or is not to be maintained for one or more UL transmissions at the UE based on indicating a frequency-hopping with zero frequency offset. In one configuration, the frequency hopping configuration component 199 may be configured to determine phase continuity is not to be applied to UL transmissions from a UE. In such configuration, the frequency hopping configuration component 199 may transmit, to the UE based on the determination, an indication of frequency hopping with zero frequency offset. In such configuration, the frequency hopping configuration component 199 may receive, from the UE, at least one uplink channel with no phase continuity based on the indication of frequency hopping with zero frequency offset.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a network entity may include a base station, one or more components of a disaggregated or virtualized base station (such as a distributed unit or a central unit), a radio unit, a transmission reception point (TRP), a relay, an intelligent reflective surface (IRS), and/or a combination thereof. For example, a base station 102 or 180 may be referred as a RAN and may include aggregated or disaggregated components. As an example of a disaggregated RAN, a base station may include a central/centralized unit (CU) 103, one or more distributed units (DU) 105, and/or one or more radio units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
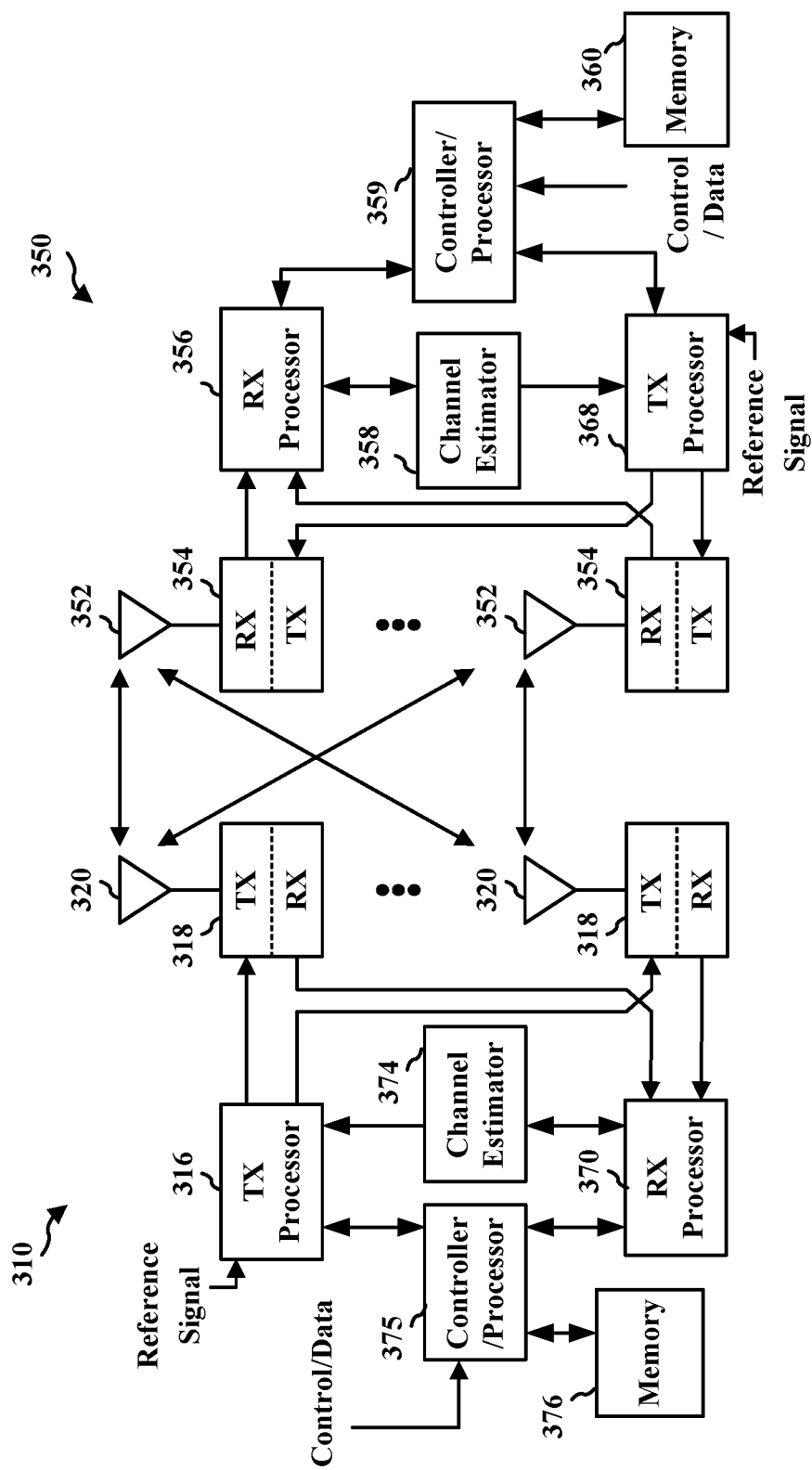
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the phase continuity determination component 198 of FIG. 1.

At least one of the TX processor 316, the RX processor 370, and the controller/processor 375 may be configured to perform aspects in connection with the frequency hopping configuration component 199 of FIG. 1.

To improve data transmissions and a successful transmission rate, a transmitting device, such as a base station (or a component of the base station) or a UE, may transmit data (e.g., via a PDSCH, PUSCH, etc.) with repetitions/retransmissions (e.g., PDSCH repetitions, PUSCH repetitions, etc.). For example, a UE may be configured to transmit a PUSCH followed by N (e.g., 2, 4, 5, etc.) repetitions. Thus, after a UE transmits a PUSCH, the UE may transmit N PUSCH repetitions. Transmitting data with repetitions of the data may increase the success rate of the transmission, as the data may have a higher chance of being received by a receiving device. For purposes of the present disclosure, the term "repetition" and the term "retransmission" may be used interchangeably, which may refer to a copy or a duplication of data that may be transmitted more than once. For example, a PUSCH repetition and a PUSCH retransmission may both refer to a copy/duplication of a PUSCH that is transmitted by a UE after the UE transmits the PUSCH.

Figure 4:
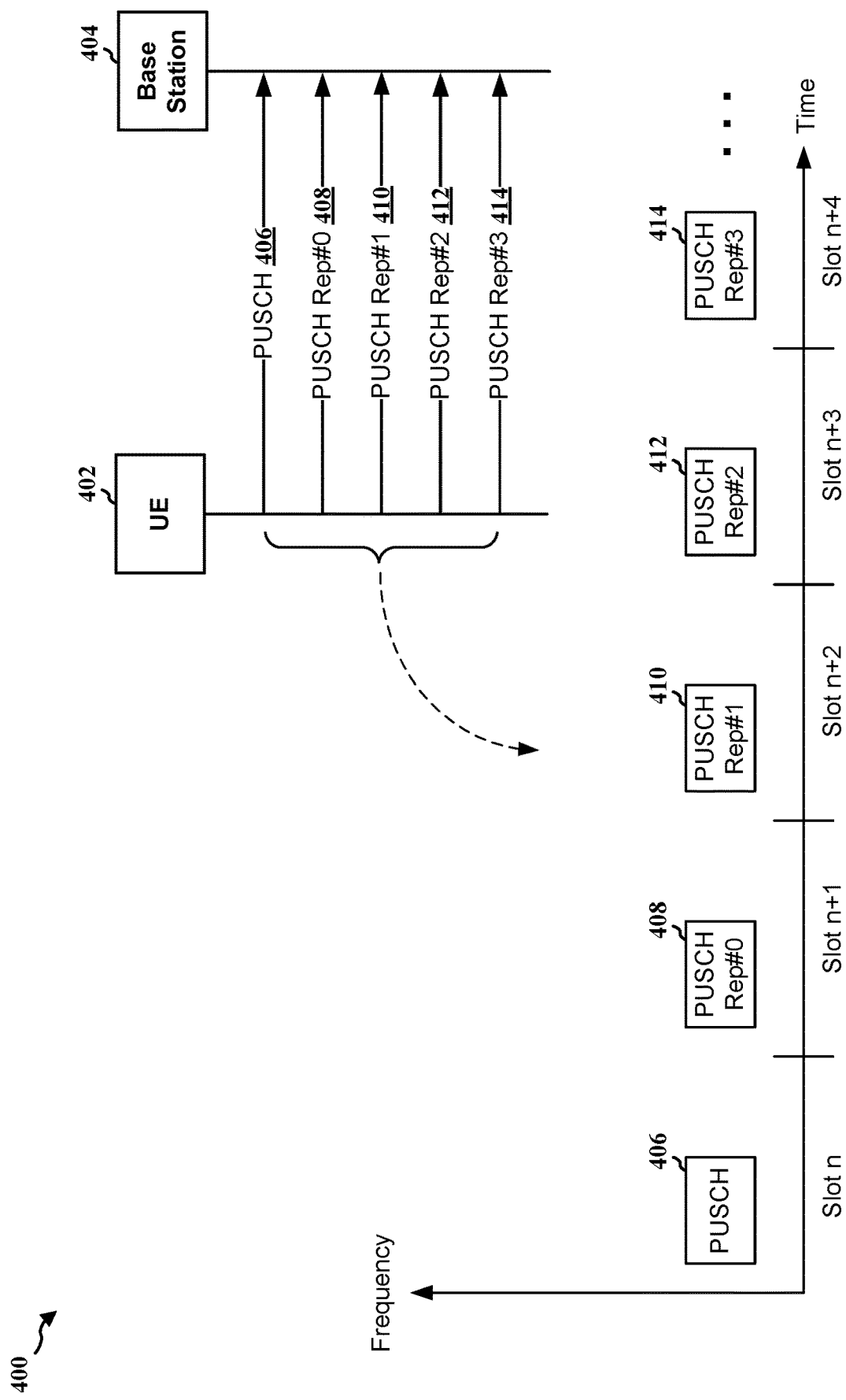
FIG. 4 is a diagram illustrating an example of a data transmission involving repetitions in accordance with various aspects of the present disclosure.

FIG. 4 is a diagram 400 illustrating an example of a data transmission involving repetitions in accordance with various aspects of the present disclosure. A UE 402 may be configured to transmit a PUSCH 406 with four (4) repetitions/retransmissions to a base station 404 (or by a component of the base station 404 or a network entity). In one example, the UE 402 may transmit the PUSCH 406 at slot n, then the UE 402 may transmit a first PUSCH repetition 408 (e.g., repetition #0) at slot n+1, a second PUSCH repetition 410 (e.g., repetition #1) at slot n+2, a third PUSCH repetition 412 (e.g., repetition #2) at slot n+3, and a fourth PUSCH repetition 414 (e.g., repetition #3) at slot n+4. The repeated transmission of the PUSCH 406 may be referred to as inter-slot repetitions. While the diagram 400 shows the repetitions (e.g., PUSCH repetitions 408, 410, 412, and 414) of the PUSCH 406 being transmitted on consecutive slots, the repetitions may also be transmitted at non-consecutive slots (e.g., at n+1, n+3, n+5, etc.) or within a same slot (e.g., intra-slot repetitions).

At times, noise at a frequency region/band may be high, which may corrupt or degrade data transmission(s) within the frequency region/band. For example, when a frequency band used by a transmitting device for transmitting data to a receiving device is experiencing worsening channel conditions or below average channel conditions (e.g., a high noise level), the transmission of the data may not be successful. To reduce or avoid an unsuccessful data transmission when a frequency band used for the data transmission encounters a high noise level, the transmitting device may apply frequency hopping or a frequency hopping spread spectrum (FHSS) to the data transmission. When utilizing frequency hopping, instead of transmitting data using a single frequency band, the transmitting device may transmit the data using multiple frequency bands. For example, the transmitting device may transmit a first portion of the data using a first frequency band, a second portion of the data using a second frequency band, a third portion of the data using a third frequency band, etc. In other words, frequency hopping is a transmission technique in which the data signal may be modulated by a narrowband carrier signal which changes frequency ("hops") over a wide band of frequencies.

Figure 5:
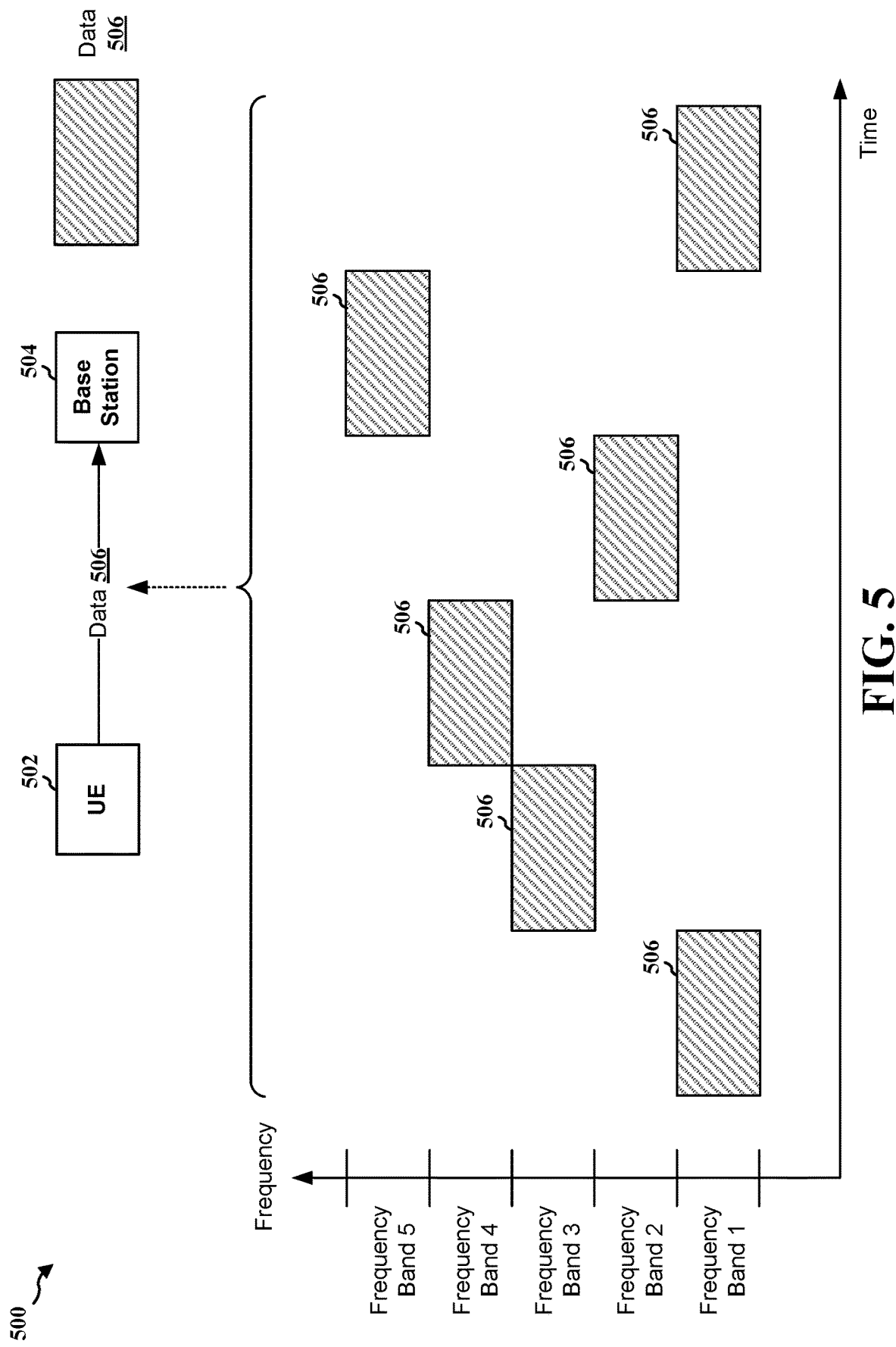
FIG. 5 is a diagram illustrating an example of frequency hopping in accordance with various aspects of the present disclosure.

FIG. 5 is a diagram 500 illustrating an example of frequency hopping in accordance with various aspects of the present disclosure. A UE 502 may transmit data 506 (e.g., via a PUSCH, PUCCH) to a base station 504 (or by a component of the base station 404 or a network entity) using different frequency resources (e.g., bands) and time resources (e.g., at different slots or within slots). For example, the UE 502 may transmit a first portion of the data 506 using a first frequency band (e.g., Frequency Band 1), a second portion of the data 506 using a third frequency band (e.g., Frequency Band 3), a third portion of the data 506 using a fourth frequency band (e.g., Frequency Band 4), a fourth portion of the data 506 using a second frequency band (e.g., Frequency Band 2), a fifth portion of the data 506 using a fifth frequency band (e.g., Frequency Band 5), and a sixth portion of the data 506 using the first frequency band (e.g., Frequency Band 1), etc. By transmitting the data 506 over different frequency bands, transmission failure caused by heavy noise at a specific frequency band may be reduced or avoided. For example, if the third frequency band (e.g., Frequency Band 3) encounters a high noise level, the UE 502 may still be able to successfully transmit other portions of the data 506 to the base station 504 through other frequency bands.

A network, e.g., a network supporting 5G NR, may support bundling of demodulation reference signals (DMRSs) across one or more time slots. For example, when one or more DMRSs are configured for a transmitting device, a receiving device may perform a joint channel estimation for shared data and/or control data transmitted from the transmitting device based on DMRS(s) received across multiple slots, as opposed to performing channel estimation separately for each individual slot based on the DMRS(s) received in that slot.

Figure 6:
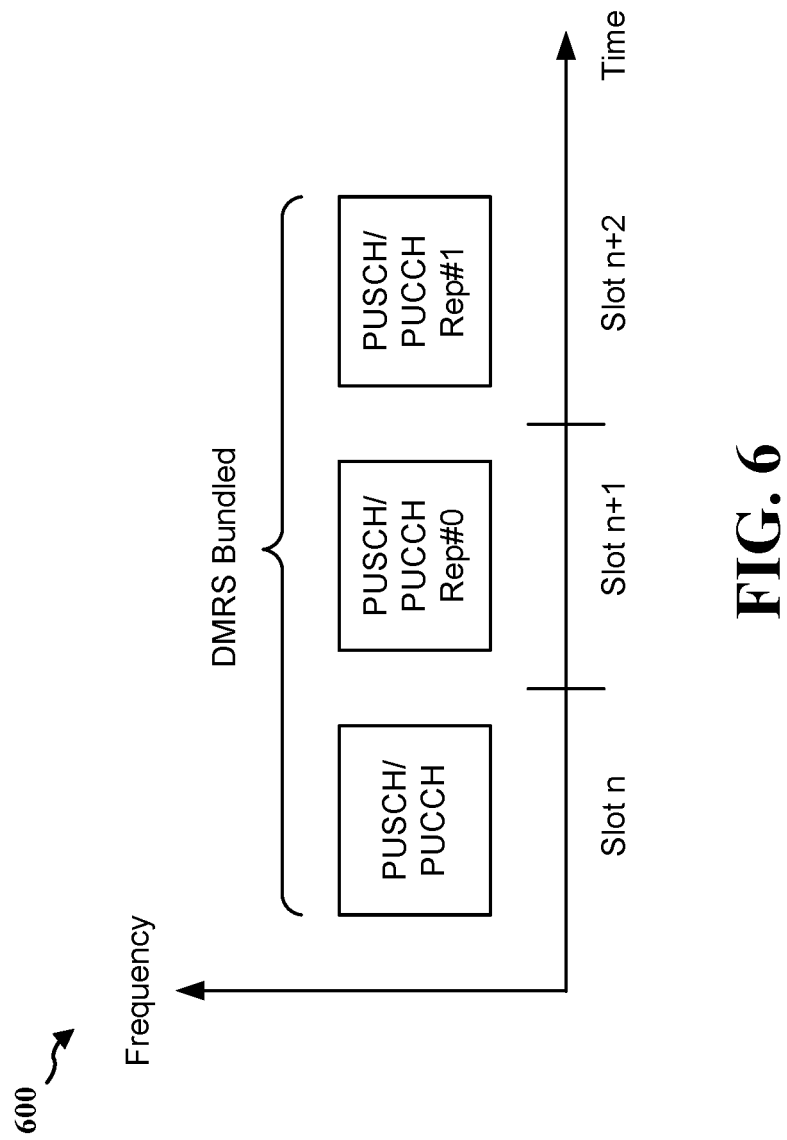
FIG. 6 is a diagram illustrating an example of demodulation reference signal (DMRS) bundling in accordance with various aspects of the present disclosure.

FIG. 6 is a diagram 600 illustrating an example of DMRS bundling in accordance with various aspects of the present disclosure. In one example, a UE may transmit a PUSCH/PUCCH in slot n, a first repetition of the PUSCH/PUCCH in slot n+1, and a second repetition of the PUSCH/PUCCH in slot n+2 to a base station. The DMRS(s) associated with the PUSCH/PUCCH and the PUSCH/PUCCH repetitions may be configured to be bundled (e.g., DMRS received in slots n, n+1, and n+2), such that the base station may perform a joint channel estimation for the PUSCH/PUCCH and the PUSCH/PUCCH repetitions based on DMRS received in slots n, n+1, and n+2, as opposed to performing separate channel estimation for each of the slots n, n+1, and n+2 based on the DMRS(s) received in that slot. DMRS bundling and joint channel estimation may improve the performance of channel estimation and/or coverage for the transmitting device and the receiving device.

Figure 7A:
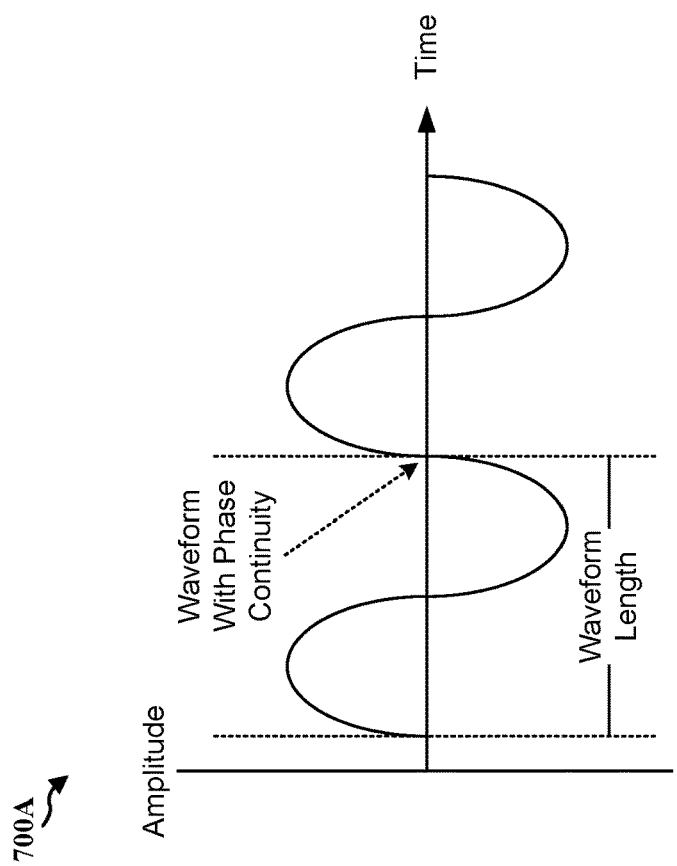
FIGS. 7A and 7B are diagrams illustrating examples of phase continuity and phase discontinuity in accordance with various aspects of the present disclosure.
Figure 7B:
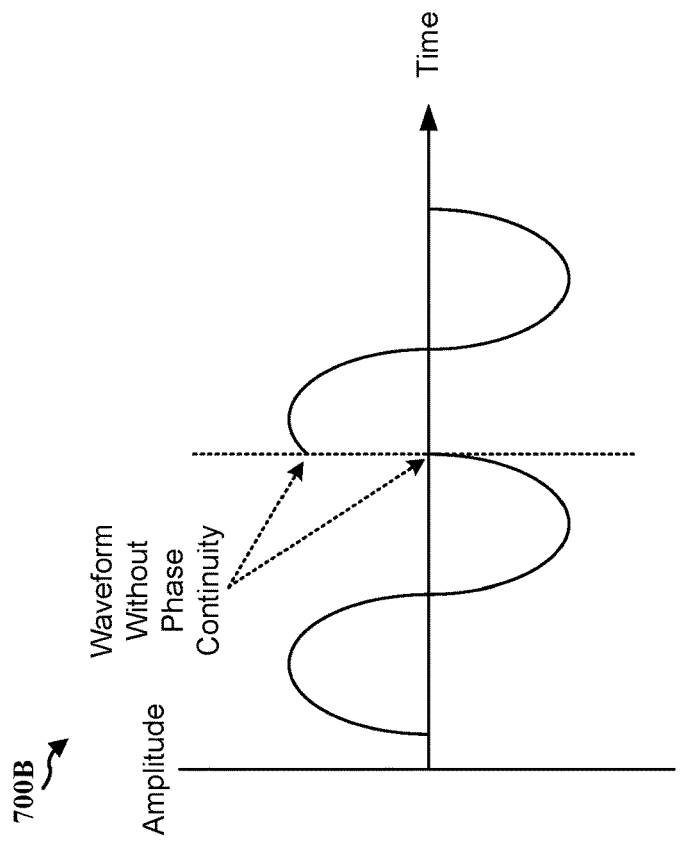

In some examples, for DMRS bundling to apply to transmissions across multiple slots, a transmitting device may be configured to maintain phase continuity for the transmissions between slots. FIGS. 7A and 7B are diagrams 700A and 700B, respectively, illustrating examples of phase continuity and phase discontinuity in accordance with various aspects of the present disclosure. As shown by the diagram 700A, an array containing a waveform may be phase-continuous if the phase of its last point is equal to the phase of its first point, minus the phase difference between any two adjacent samples. In other words, phase continuity may refer to signals transmitted in any two adjacent timeslots without a change in phase. On the other hand, as shown in diagram 700B, a waveform array may not be phase-continuous if the phase of its last point is different from the phase of its first point. In other words, phase discontinuity may refer to a change in phase between signals transmitted in any two adjacent timeslots. Thus, if a transmitting device is unable to maintain phase continuity for the transmissions between slots, a receiving device may not be able to perform DMRS bundling (or joint channel estimation) for the transmissions. For example, if a UE is unable to maintain phase continuity for an uplink transmission, a base station may not apply DMRS bundling for the uplink transmission.

In some examples, frequency-hopping, such as frequency-hopping with a large frequency offset, and/or beam switching performed by a transmitting device may disrupt the phase continuity. For example, when a UE performs a beam switch (e.g., a switch of an uplink beam) and/or when a UE applies frequency-hopping to an uplink transmission, the UE may not be able to maintain or assume phase continuity for the uplink transmission(s). Thus, a base station may not be able to perform DMRS bundling (e.g., perform joint channel estimation) for the uplink transmission received form the UE. As such, if a transmitting device is configured to perform a beam switch for a transmission, a receiving device may be configured not to assume the transmission is transmitted with phase continuity. On the other hand, this may also indicate that if a receiving device is not assuming or expecting phase continuity to be applied for a transmission from a transmitting device, the transmitting device may apply (or may be permitted to apply) a beam switch for the transmission. For example, a UE may be permitted to (or knows it is permitted to) apply a beam switching for a transmission if the base station does not expect the transmission to be transmitted with phase continuity.

Aspects presented herein may enable a receiving device to indicate to a transmitting device that DMRS bundling is not to be performed or expected at the receiving device based on an indication associated with a frequency offset that is to be applied to frequency hopping at the transmitting device. In one aspect of the present disclosure, as frequency-hopping with zero frequency offset may be utilized by a transmitting device in a similar manner to no frequency hopping (e.g., there is no change in frequency for the frequency-hopping and the data is transmitted using a frequency band), a transmitting device, such as a UE, may be configured to apply a beam switch for a transmission or configured to assume the beam switch is permissible/allowed for the transmission when the transmitting device is configured with frequency-hopping with zero frequency offset. In other words, frequency hopping without a frequency offset may be configured to be associated with no DMRS bundling (e.g., no joint channel estimation). For example, a base station may indicate to a UE that the base station is not expecting or performing DMRS bundling (e.g., joint channel estimation) for one or more uplink transmissions from the UE if the base station configures frequency hopping for the one or more uplink transmissions with zero frequency offset, such that the UE may apply (or may know it is permitted to apply) a beam switch for the one or more uplink transmissions without receiving an additional indication (e.g., explicit permission/configuration) from the base station. As such, control signaling between the UE and the base station may be reduced to improve the efficiency of the communication between the UE and the base station.

Figure 8:
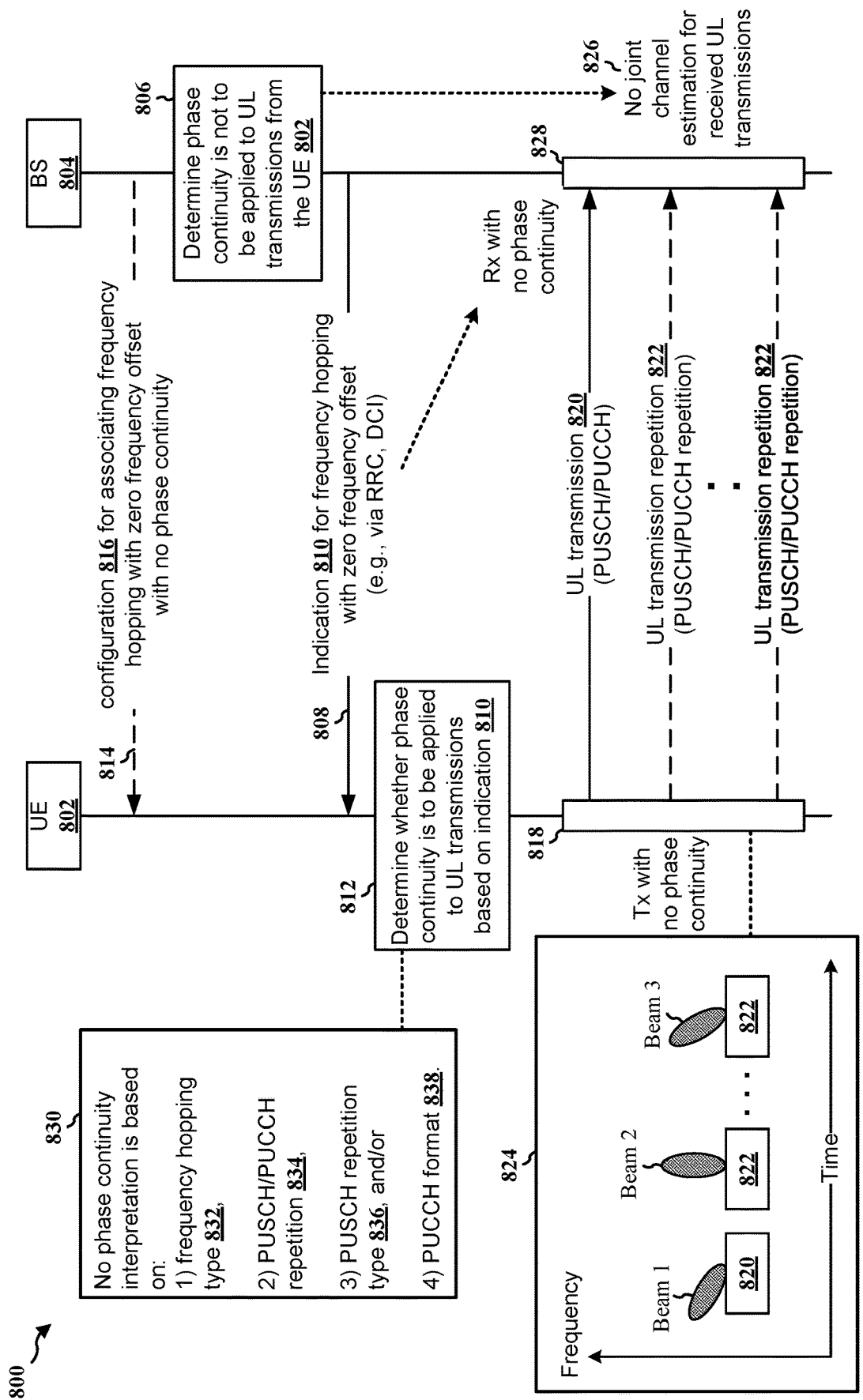
FIG. 8 is a communication flow between a UE and a base station illustrating an example of associating frequency-hopping with zero offset with indication of no phase continuity (or no joint channel estimation/DMRS bundling) according to aspects of the present disclosure.

FIG. 8 is a communication flow 800 between a UE and a base station illustrating an example of associating frequency-hopping with zero offset with an indication of no phase continuity (or no joint channel estimation/DMRS bundling) according to aspects of the present disclosure. As described in connection with FIG. 1, in some aspects, a base station may include disaggregated components, such as a CU, one or more DUs, one or more RUs, one or more TRPs, one or more relays, one or more intelligent reflective surfaces, and/or a combination thereof. As such, for purposes of the present disclosure, the term "base station" may include component(s) of a base station. In some examples, the term "base station" may also be used interchangeably with the term "network entity" or "network node," which may refer to or include one or more disaggregated components of a base station.

In one example, as shown at 806, a base station 804 may determine phase continuity is not to be applied, or is not expected to be applied, to one or more uplink (UL) transmissions from a UE 802.

At 808, based on the determination that the phase continuity is not to be applied, or is not expected to be applied, to one or more UL transmissions from the UE 802, the base station 804 may transmit an indication 810 (or a configuration) for frequency hopping with zero frequency offset to the UE 802. In one example, the base station 804 may transmit the indication 810 via radio resource control (RRC) signaling and/or downlink control information (DCI), and the base station 804 may transmit the indication 810 with at least one of a schedule for uplink transmissions or control information for the frequency hopping. For example, if the base station 804 transmits the indication 810 via the RRC signaling, the indication 810 may correspond to a configured grant (CG), whereas if the base station 804 transmits the indication 810 via the DCI, the indication 810 may correspond to a dynamic grant (DG), etc. In another example, the frequency hopping may be associated with an inter-slot frequency hopping and/or an intra-slot frequency hopping.

In response, as shown at 812, after the UE 802 receives the indication 810 that configures/indicates frequency hopping with zero frequency offset for one or more UL transmissions at the UE 802, the UE 802 may determine whether phase continuity is to be applied to one or more UL transmissions. In other words, the UE 802 may be configured to associate the frequency hopping with zero frequency offset with no phase continuity in the UL transmissions. For example, if the UE 802 receives or is configured with frequency hopping with zero frequency offset, the UE 802 may assume that the base station 804 is not expecting the UE 802 to maintain phase continuity for one or more UL transmissions.

In one example, as shown at 814, the base station 804 may transmit a configuration 816 to the UE 802 to configure the UE 802 to associate the frequency hopping with zero frequency offset with no phase continuity in one or more UL transmissions. In another example, the association may be defined and preconfigured at the UE 802 (e.g., without receiving a configuration from the base station 804).

At 818, based on the determination to not apply phase continuity to the UL transmissions, the UE 802 may transmit at least one uplink channel with no phase continuity to the base station 804. In one example, the at least one uplink channel may include an uplink transmission 820 (e.g., PUSCH/PUCCH) and additionally one or more repetitions 822 for the uplink transmission 820.

In one aspect of the present disclosure, if the UE 802 determines to not apply phase continuity to the UL transmissions, such as the UL transmission 820 and the UL transmission repetitions 822, the UE 802 may also determine whether to apply an UL transmit beam switching for transmitting the UL transmissions. For example, as shown at 824, if the UE 802 determines to not apply phase continuity to the UL transmissions, the UE 802 may apply the UL transmit beam switching for transmitting the UL transmission. As an example, the UE 802 may transmit the UL transmission 820 using a first UL transmit beam (e.g., beam 1), one UL transmission repetition 822 using a second UL transmit beam (e.g., beam 2), and another UL transmission repetition 822 using a third UL transmit beam (e.g., beam 3), etc. In other words, the at least one uplink channel may be transmitted based on the applied UL transmit beam switching with no phase continuity.

Similarly, as shown at 826, after the base station 804 determines that phase continuity is not to be applied to UL transmissions from the UE 802 and/or after the base station 804 transmits the indication 810 to the UE 802, the base station 804 may determine to not apply a joint channel estimation to one or more PUSCHs/PUCCHs and additionally their repetitions from the UE 802. Thus, as shown at 828, the base station 804 may receive at least one uplink channel (e.g., as the UL transmission 820 and/or the UL transmission repetitions 822) without phase continuity from the UE 802 based on the indication 810.

In another aspect of the present disclosure, as shown at 830, the association (e.g., interpretation) between the frequency-hopping with zero offset and the no phase continuity may apply to specific frequency hopping type 832, PUSCH/PUCCH repetition(s) 834, PUSCH repetition type 836, and/or PUCCH format(s) 838, etc. For example, the association may apply to one of inter-slot frequency hopping or intra-slot frequency hopping. In other words, the interpretation (for no phase continuity) may be valid depending on the frequency-hopping type (i.e., whether it is intra-slot frequency hopping or inter-slot frequency hopping). In another example, the association may apply when the one or more UL transmissions include PUSCH/PUCCH repetitions. In another example, the association may apply to one of a PUSCH repetition Type A or a PUSCH repetition Type B. In another example, the association may apply to one or more PUCCH formats, which may include at least one of PUCCH format 0, PUCCH format 1, PUCCH format 2, PUCCH format 3, or PUCCH format 4. In other words, the interpretation (for no phase continuity) may be valid for PUSCH and PUCCH repetitions, may be valid depending on the type of PUSCH repetition, and/or may be valid depending on the PUCCH format, etc.

Figure 9:
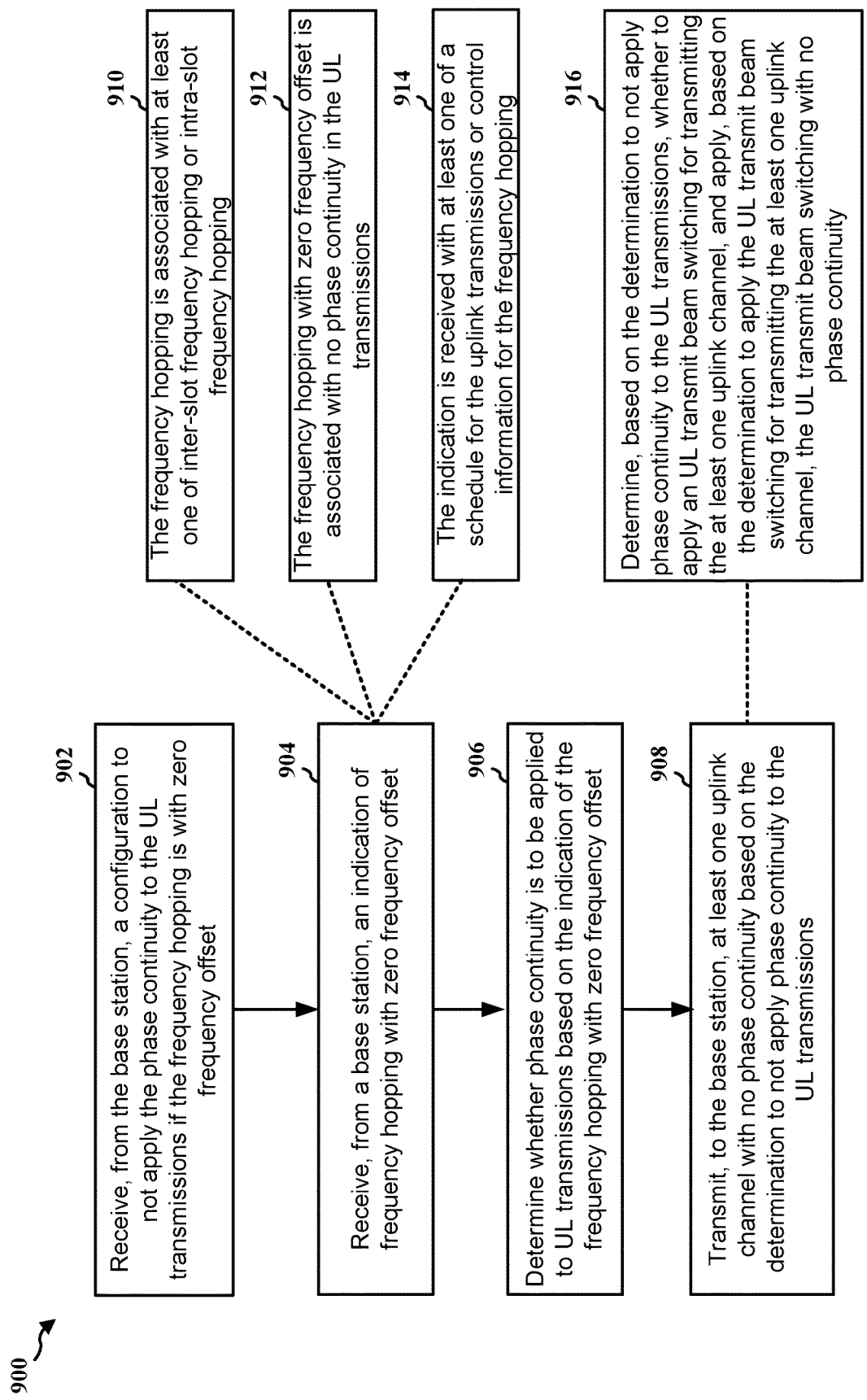
FIG. 9 is a flowchart of a method of wireless communication in accordance with aspects presented herein.

FIG. 9 is a flowchart 900 of a method of wireless communication. The method may be performed by a UE or a component of a UE (e.g., the UE 104, 402, 502, 802; the apparatus 1002; a processing system, which may include the memory 360 and which may be the entire UE 350 or a component of the UE 350, such as the TX processor 368, the RX processor 356, and/or the controller/processor 359). The method may enable the UE to determine whether phase continuity is expected or is to be maintained for one or more UL transmissions when the UE is configured with a frequency-hopping with zero frequency offset.

At 902, the UE may receive, from a network entity, a configuration to not apply the phase continuity to the UL transmissions if the frequency hopping is with zero frequency offset, such as described in connection with FIG. 8. For example, at 814, the UE 802 may receive a configuration 816 from the base station 804 for associating frequency hopping with zero frequency offset with no phase continuity. The reception of the configuration may be performed, e.g., by the phase continuity configuration component 1040 and/or reception component 1030 of the apparatus 1002 in FIG. 10.

At 904, the UE may receive, from the network entity, an indication of frequency hopping with zero frequency offset, such as described in connection with FIG. 8. For example, at 808, the UE 802 may receive an indication 810 from the base station 804 indicating frequency hopping with zero frequency offset. The reception of the indication may be performed, e.g., by the frequency hopping process component 1042 and/or reception component 1030 of the apparatus 1002 in FIG. 10. The frequency hopping with zero frequency offset may be associated with no phase continuity in the UL transmissions, as shown at 912.

In one example, as shown at 910, the frequency hopping may be associated with at least one of inter-slot frequency hopping or intra-slot frequency hopping.

In another example, as shown at 914, the indication may be received with at least one of a schedule for the uplink transmissions or control information for the frequency hopping. In such an example, the indication may be received via at least one of RRC signaling or DCI. In such an example, the indication received via the RRC signaling may correspond to a configured grant from the network entity and the indication received via the DCI may correspond to a dynamic grant from the network entity.

At 906, the UE may determine whether phase continuity is to be applied to UL transmissions based on the indication of the frequency hopping with zero frequency offset, such as described in connection with FIG. 8. For example, at 812, the UE 802 may determine whether phase continuity is to be applied to UL transmissions based on the indication 810. The determination of whether phase continuity is to be applied may be performed, e.g., by the phase continuity determination component 1044 of the apparatus 1002 in FIG. 10.

At 908, the UE may transmit, to the network entity, at least one uplink channel with no phase continuity based on the determination to not apply phase continuity to the UL transmissions, such as described in connection with FIG. 8. For example, at 818, the UE 802 may transmit UL transmission 820 (e.g., PUSCH/PUCCH) and additionally UL transmission repetition(s) 822 to the base station 804 with no phase continuity. The transmission of the at least one uplink channel with no phase continuity may be performed, e.g., by the no phase continuity process component 1046 and/or the transmission component 1034 of the apparatus 1002 in FIG. 10.

In one example, as shown at 916, the UE may determine, based on the determination to not apply phase continuity to the UL transmissions, whether to apply an UL transmit beam switching for transmitting the at least one uplink channel, and the UE may apply, based on the determination to apply the UL transmit beam switching for transmitting the at least one uplink channel, the UL transmit beam switching with no phase continuity, such as described in connection with 824 of FIG. 8. In such an example, the at least one uplink channel may be transmitted based on the applied UL transmit beam switching with no phase continuity.

In another example, as described in connection with 830 of FIG. 8, the at least one uplink channel may be at least one of a PUSCH or a PUCCH. In such an example, the at least one of the PUSCH or the PUCCH may be a PUSCH repetition or a PUCCH repetition. In such an example, the PUSCH repetition may be associated with at least one of a PUSCH repetition Type A or a PUSCH repetition Type B. In such an example, the PUCCH may be associated with at least one of a plurality of PUCCH formats. In such an example, the plurality of PUCCH formats may include at least one of PUCCH format 0, PUCCH format 1, PUCCH format 2, PUCCH format 3, or PUCCH format 4.

Figure 10:
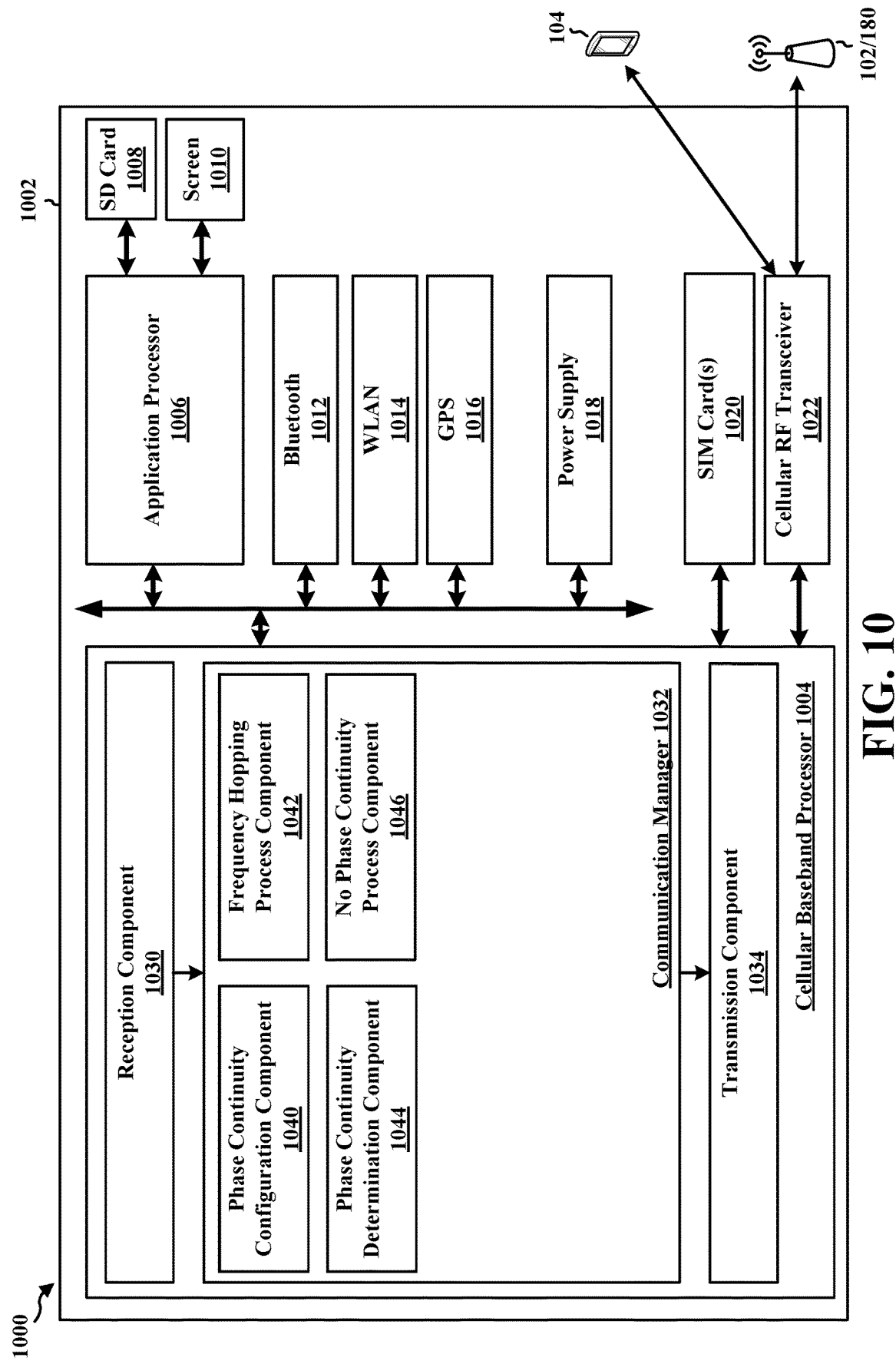
FIG. 10 is a diagram illustrating an example of a hardware implementation for an example apparatus in accordance with aspects presented herein.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a phase continuity configuration component 1040 that is configured to receive, from the network entity, a configuration to not apply the phase continuity to the UL transmissions if the frequency hopping is with zero frequency offset, e.g., as described in connection with 902 of FIG. 9. The communication manager 1032 further includes a frequency hopping process component 1042 that is configured to receive, from a network entity, an indication of frequency hopping with zero frequency offset, e.g., as described in connection with 904 of FIG. 9. The communication manager 1032 further includes a phase continuity determination component 1044 that is configured to determine whether phase continuity is to be applied to UL transmissions based on the indication of the frequency hopping with zero frequency offset, e.g., as described in connection with 906 of FIG. 9. The communication manager 1032 further includes a no phase continuity process component 1046 that is configured to transmit, to the network entity, at least one uplink channel with no phase continuity based on the determination to not apply phase continuity to the UL transmissions, e.g., as described in connection with 908 of FIG. 9.

The apparatus may include additional components that perform each of the blocks of the algorithm in the flowchart of FIG. 9. As such, each block in the flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from the network entity, a configuration to not apply the phase continuity to the UL transmissions if the frequency hopping is with zero frequency offset (e.g., the phase continuity configuration component 1040 and/or reception component 1030). The apparatus 1002 includes means for receiving, from a network entity, an indication of frequency hopping with zero frequency offset (e.g., the frequency hopping process component 1042 and/or reception component 1030). The apparatus 1002 includes means for determining whether phase continuity is to be applied to UL transmissions based on the indication of the frequency hopping with zero frequency offset (e.g., the phase continuity determination component 1044). The apparatus 1002 includes means for transmitting, to the network entity, at least one uplink channel with no phase continuity based on the determination to not apply phase continuity to the UL transmissions (e.g., the no phase continuity process component 1046 and/or the transmission component 1034). The frequency hopping with zero frequency offset may be associated with no phase continuity in the UL transmissions.

In one configuration, the frequency hopping may be associated with at least one of inter-slot frequency hopping or intra-slot frequency hopping.

In another configuration, the indication may be received with at least one of a schedule for the uplink transmissions or control information for the frequency hopping. In such a configuration, the indication may be received via at least one of RRC signaling or DCI. In such a configuration, the indication received via the RRC signaling may correspond to a configured grant from the network entity and the indication received via the DCI may correspond to a dynamic grant from the network entity.

In another configuration, the UE may determine, based on the determination to not apply phase continuity to the UL transmissions, whether to apply an UL transmit beam switching for transmitting the at least one uplink channel, and the UE may apply, based on the determination to apply the UL transmit beam switching for transmitting the at least one uplink channel, the UL transmit beam switching with no phase continuity. In such a configuration, the at least one uplink channel may be transmitted based on the applied UL transmit beam switching with no phase continuity.

In another configuration, the at least one uplink channel may be at least one of a PUSCH or a PUCCH. In such a configuration, the at least one of the PUSCH or the PUCCH may be a PUSCH repetition or a PUCCH repetition. In such a configuration, the PUSCH repetition may be associated with at least one of a PUSCH repetition Type A or a PUSCH repetition Type B. In such a configuration, the PUCCH may be associated with at least one of a plurality of PUCCH formats. In such a configuration, the plurality of PUCCH formats may include at least one of PUCCH format 0, PUCCH format 1, PUCCH format 2, PUCCH format 3, or PUCCH format 4.

The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
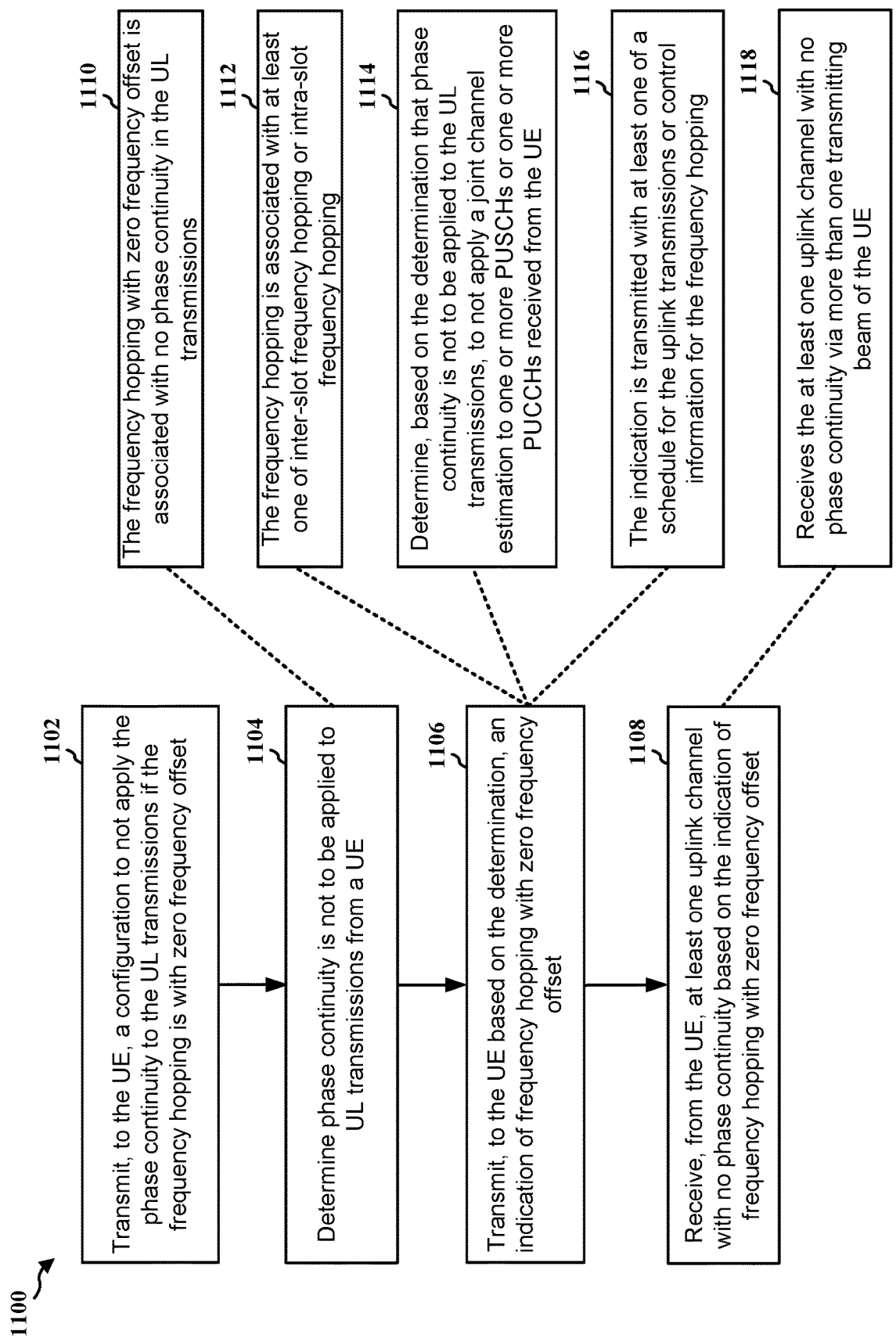
FIG. 11 is a flowchart of a method of wireless communication in accordance with aspects presented herein.

FIG. 11 is a flowchart 1100 of a method of wireless communication. The method may be performed by a network entity or a component of a network entity (e.g., the base station 102, 180, 310, 404, 504, 804; the apparatus 1202; a processing system, which may include the memory 376 and which may be the entire base station 310 or a component of the base station 310, such as the TX processor 316 the RX processor 370, and/or the controller/processor 375). The method may enable the network entity to indicate to a UE that phase continuity is not expected or is not to be maintained for one or more UL transmissions at the UE based on indicating a frequency-hopping with zero frequency offset. In some examples, the network entity may be a RAN/base station, or one or more component of a RAN/base station (e.g., a CU, one or more DUs, one or more RUs, one or more TRPs, one or more relays, one or more intelligent reflective surfaces, and/or a combination thereof).

At 1102, the network entity may transmit, to the UE, a configuration to not apply the phase continuity to the UL transmissions if the frequency hopping is with zero frequency offset, such as described in connection with FIG. 8. For example, at 814, the base station 804 may transmit a configuration 816 to the UE 802 that associates frequency hopping with zero frequency offset with no phase continuity. The transmission of the configuration may be performed, e.g., by the phase continuity configuration component 1240 and/or the transmission component 1234 of the apparatus 1202 in FIG. 12.

At 1104, the network entity may determine phase continuity is not to be applied to UL transmissions from a UE, such as described in connection with FIG. 8. For example, at 806, the base station 804 may determine phase continuity is not to be applied to UL transmissions from the UE 802. The determination of the phase continuity is not to be applied to UL transmissions from a UE may be performed, e.g., by the phase continuity determination component 1242 of the apparatus 1202 in FIG. 12. As shown at 1110, the frequency hopping with zero frequency offset may be associated with no phase continuity in the UL transmissions.

At 1106, the network entity may transmit, to the UE based on the determination, an indication of frequency hopping with zero frequency offset, such as described in connection with FIG. 8. For example, at 808, the base station 804 may transmit an indication 810 to the UE 802 for frequency hopping with zero frequency offset. The transmission of the indication may be performed, e.g., by the frequency hopping indication component 1244 and/or the transmission component 1234 of the apparatus 1202 in FIG. 12.

In one example, as shown at 1112, the frequency hopping may be associated with at least one of inter-slot frequency hopping or intra-slot frequency hopping.

In another example, as shown at 1116, the indication may be transmitted with at least one of a schedule for the uplink transmissions or control information for the frequency hopping. In such an example, the indication may be transmitted via at least one of RRC signaling or DCI. In such an example, the indication transmitted via the RRC signaling may correspond to a configured grant and the indication transmitted via the DCI may correspond to a dynamic grant.

In another example, as shown at 1114, the network entity may determine, based on the determination that phase continuity is not to be applied to the UL transmissions, to not apply a joint channel estimation to one or more PUSCHs or one or more PUCCHs received from the UE, such as described in connection with 826 of FIG. 8. In such an example, the at least one of the one or more PUSCHs or the one or more PUCCHs may be a PUSCH repetition or a PUCCH repetition.

At 1108, the network entity may receive, from the UE, at least one uplink channel with no phase continuity based on the indication of frequency hopping with zero frequency offset, such as described in connection with FIG. 8. For example, at 828, the base station 804 may receive, from the UE 802, UL transmission 820 and additionally UL transmission repetition(s) 822 with no phase continuity based on the indication of frequency hopping with zero frequency offset. The reception of the at least one uplink channel with no phase continuity may be performed, e.g., by the UL transmission process component 1246 and/or the reception component 1230 of the apparatus 1202 in FIG. 12.

In one example, as described in connection with 830 of FIG. 8, the at least one uplink channel may be at least one of a PUSCH or a PUCCH. In such an example, the at least one of the PUSCH or the PUCCH may be a PUSCH repetition or a PUCCH repetition. In such an example, the PUSCH repetition may be associated with at least one of a PUSCH repetition Type A or a PUSCH repetition Type B. In such an example, the PUCCH may be associated with at least one of a plurality of PUCCH formats. In such an example, the plurality of PUCCH formats may include at least one of PUCCH format 0, PUCCH format 1, PUCCH format 2, PUCCH format 3, or PUCCH format 4.

In another example, as shown at 1118, the network entity may receive the at least one uplink channel with no phase continuity via more than one transmitting beam of the UE.

Figure 12:
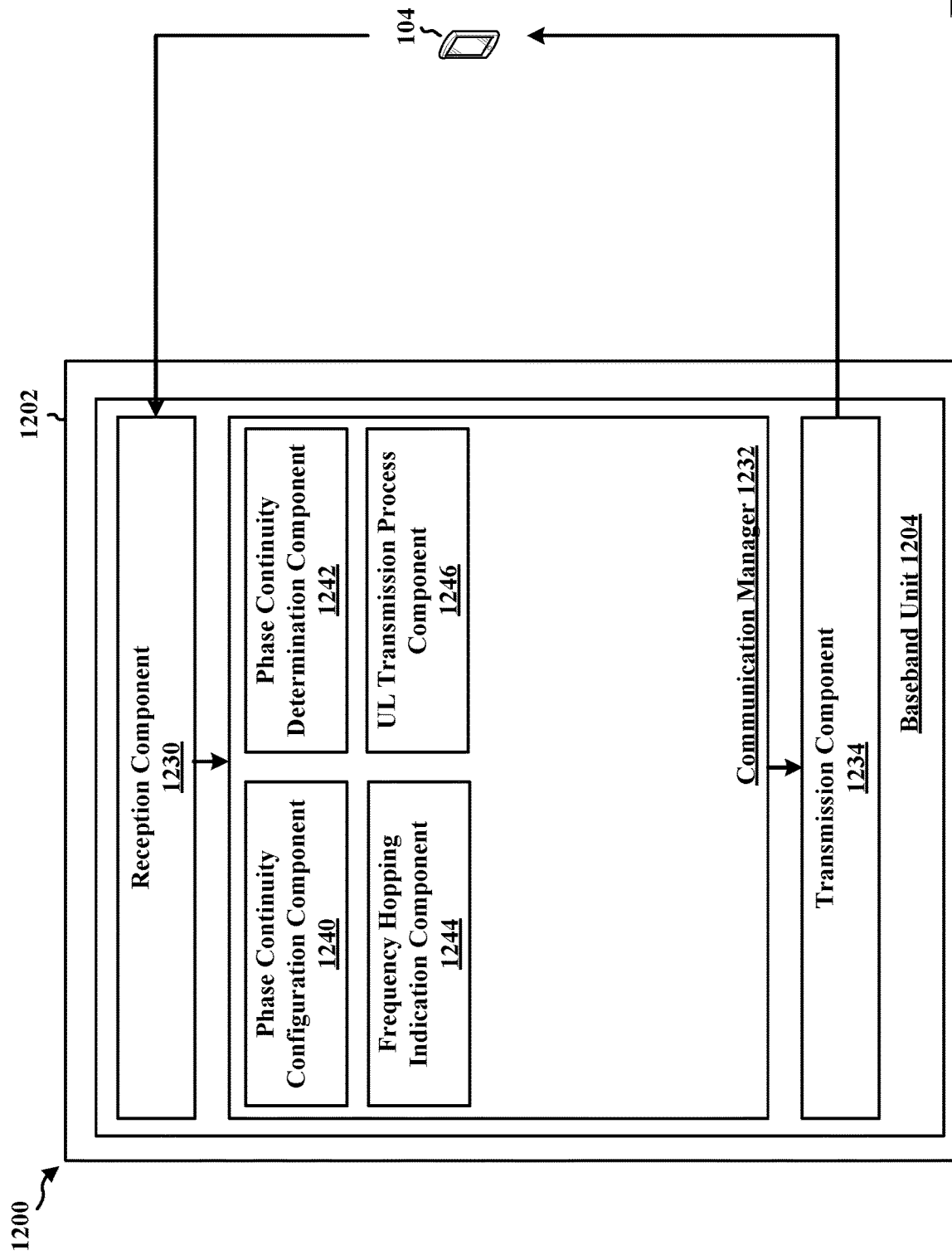
FIG. 12 is a diagram illustrating an example of a hardware implementation for an example apparatus in accordance with aspects presented herein.

FIG. 12 is a diagram 1200 illustrating an example of a hardware implementation for an apparatus 1202. The apparatus 1202 is a network entity (e.g., a base station or component(s) of the base station) and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a phase continuity configuration component 1240 that is configured to transmit, to the UE, a configuration to not apply the phase continuity to the UL transmissions if the frequency hopping is with zero frequency offset, e.g., as described in connection with 1102 of FIG. 11. The communication manager 1232 further includes a phase continuity determination component 1242 that is configured to determine phase continuity is not to be applied to UL transmissions from a UE, e.g., as described in connection with 1104 of FIG. 11. The communication manager 1232 further includes a frequency hopping indication component 1244 that is configured to transmit, to the UE based on the determination, an indication of frequency hopping with zero frequency offset, e.g., as described in connection with 1106 of FIG. 11. The communication manager 1232 further includes an UL transmission process component 1246 that is configured to receive, from the UE, at least one uplink channel with no phase continuity based on the indication of frequency hopping with zero frequency offset, e.g., as described in connection with 1108 of FIG. 11.

The apparatus may include additional components that perform each of the blocks of the algorithm in the flowchart of FIG. 11. As such, each block in the flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting, to the UE, a configuration to not apply the phase continuity to the UL transmissions if the frequency hopping is with zero frequency offset (e.g., the phase continuity configuration component 1240 and/or the transmission component 1234). The apparatus 1202 includes means for determining phase continuity is not to be applied to UL transmissions from a UE (e.g., the phase continuity determination component 1242). The apparatus 1202 includes means for transmitting, to the UE based on the determination, an indication of frequency hopping with zero frequency offset (e.g., the frequency hopping indication component 1244 and/or the transmission component 1234). The apparatus 1202 includes means for receiving, from the UE, at least one uplink channel with no phase continuity based on the indication of frequency hopping with zero frequency offset (e.g., the UL transmission process component 1246 and/or the reception component 1230). The frequency hopping with zero frequency offset may be associated with no phase continuity in the UL transmissions.

In one configuration, the frequency hopping may be associated with at least one of inter-slot frequency hopping or intra-slot frequency hopping.

In another configuration, the indication may be transmitted with at least one of a schedule for the uplink transmissions or control information for the frequency hopping. In such a configuration, the indication may be transmitted via at least one of RRC signaling or DCI. In such a configuration, the indication transmitted via the RRC signaling may correspond to a configured grant and the indication transmitted via the DCI may correspond to a dynamic grant.

In another configuration, the apparatus 1202 includes means for determining, based on the determination that phase continuity is not to be applied to the UL transmissions, to not apply a joint channel estimation to one or more PUSCHs or one or more PUCCHs received from the UE, such as described in connection with 826 of FIG. 8. In such a configuration, the at least one of the one or more PUSCHs or the one or more PUCCHs may be a PUSCH repetition or a PUCCH repetition.

In one configuration, the at least one uplink channel may be at least one of a PUSCH or a PUCCH. In such a configuration, the at least one of the PUSCH or the PUCCH may be a PUSCH repetition or a PUCCH repetition. In such a configuration, the PUSCH repetition may be associated with at least one of a PUSCH repetition Type A or a PUSCH repetition Type B. In such a configuration, the PUCCH may be associated with at least one of a plurality of PUCCH formats. In such a configuration, the plurality of PUCCH formats may include at least one of PUCCH format 0, PUCCH format 1, PUCCH format 2, PUCCH format 3, or PUCCH format 4.

In another configuration, the apparatus 1202 includes means for receiving the at least one uplink channel with no phase continuity via more than one transmitting beam of the UE.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects presented herein may enable a receiving device, such as a network entity (e.g., a base station or component(s) of the base station), to indicate to a transmitting device, such as a UE, that DMRS bundling (or joint channel estimation) is not to be performed or expected at the receiving device based on an indication for a frequency offset that is to be applied to frequency hopping at the transmitting device to reduce an overall control signaling between the transmitting device and the receiving device.

The following examples set forth additional aspects and are illustrative only and aspects thereof may be combined with aspects of other embodiments or teaching described herein, without limitation.

Aspect 1 a method for wireless communication at a UE, including: receiving, from a network entity, an indication of frequency hopping with zero frequency offset; determining whether phase continuity is to be applied to UL transmissions based on the indication of the frequency hopping with zero frequency offset; and transmitting, to the network entity, at least one uplink channel with no phase continuity based on the determination to not apply phase continuity to the UL transmissions.

In aspect 2, the method of aspect 1 further includes that the frequency hopping is associated with at least one of inter-slot frequency hopping or intra-slot frequency hopping.

In aspect 3, the method of aspect 1 or aspect 2 further includes that the frequency hopping with zero frequency offset is associated with no phase continuity in the UL transmissions.

In aspect 4, the method of any of aspects 1-3 further includes: receiving, from the network entity, a configuration to not apply the phase continuity to the UL transmissions if the frequency hopping is with zero frequency offset.

In aspect 5, the method of any of aspects 1-4 further includes that the indication is received with at least one of a schedule for the uplink transmissions or control information for the frequency hopping.

In aspect 6, the method of any of aspects 1-5 further includes that the indication is received via at least one of RRC signaling or DCI.

In aspect 7, the method of any of aspects 1-6 further includes that the indication received via the RRC signaling corresponds to a configured grant from the network entity and the indication received via the DCI corresponds to a dynamic grant from the network entity.

In aspect 8, the method of any of aspects 1-7 further includes: determining, based on the determination to not apply phase continuity to the UL transmissions, whether to apply an UL transmit beam switching for transmitting the at least one uplink channel; and applying, based on the determination to apply the UL transmit beam switching for transmitting the at least one uplink channel, the UL transmit beam switching with no phase continuity.

In aspect 9, the method of any of aspects 1-8 further includes that the at least one uplink channel is transmitted based on the applied UL transmit beam switching with no phase continuity.

In aspect 10, the method of any of aspects 1-9 further includes that the at least one uplink channel is at least one of a PUSCH or a PUCCH.

In aspect 11, the method of any of aspects 1-10 further includes that at least one of the PUSCH or the PUCCH is a PUSCH repetition or a PUCCH repetition.

In aspect 12, the method of any of aspects 1-11 further includes that the PUSCH repetition is associated with at least one of a PUSCH repetition Type A or a PUSCH repetition Type B.

In aspect 13, the method of any of aspects 1-12 further includes that the PUCCH is associated with at least one of a plurality of PUCCH formats.

In aspect 14, the method of any of aspects 1-13 further includes that the plurality of PUCCH formats includes at least one of PUCCH format 0, PUCCH format 1, PUCCH format 2, PUCCH format 3, or PUCCH format 4.

Aspect 15 is an apparatus for wireless communication including at least one processor coupled to a memory and configured to implement a method as in any of aspects 1 to 14.

Aspect 16 is an apparatus for wireless communication including means for implementing a method as in any of aspects 1 to 14.

Aspect 17 is a non-transitory computer-readable medium storing computer executable code, where the code when executed by a processor causes the processor to implement a method as in any of aspects 1 to 14.

Aspect 18 is a method for wireless communication at a network entity, including: determining phase continuity is not to be applied to UL transmissions from a UE; transmitting, to the UE based on the determination, an indication of frequency hopping with zero frequency offset; and receiving, from the UE, at least one uplink channel with no phase continuity based on the indication of frequency hopping with zero frequency offset.

In aspect 19, the method of aspect 18 further includes that the frequency hopping is associated with at least one of inter-slot frequency hopping or intra-slot frequency hopping.

In aspect 20, the method of aspect 18 or aspect 19 further includes that the frequency hopping with zero frequency offset is associated with no phase continuity in the UL transmissions.

In aspect 21, the method of any of aspects 18-20 further includes: transmitting, to the UE, a configuration to not apply the phase continuity to the UL transmissions if the frequency hopping is with zero frequency offset.

In aspect 22, the method of any of aspects 18-21 further includes that the indication is transmitted with at least one of a schedule for the uplink transmissions or control information for the frequency hopping.

In aspect 23, the method of any of aspects 18-22 further includes that the indication is transmitted via at least one of RRC signaling or DCI.

In aspect 24, the method of any of aspects 18-23 further includes that the indication transmitted via the RRC signaling corresponds to a configured grant and the indication transmitted via the DCI corresponds to a dynamic grant.

In aspect 25, the method of any of aspects 18-24 further includes: determining, based on the determination that phase continuity is not to be applied to the UL transmissions, to not apply a joint channel estimation to one or more PUSCHs or one or more PUCCHs received from the UE.

In aspect 26, the method of any of aspects 18-25 further includes that at least one of the one or more PUSCHs or the one or more PUCCHs is a PUSCH repetition or a PUCCH repetition.

In aspect 27, the method of any of aspects 18-26 further includes that the at least one uplink channel is at least one of a PUSCH or a PUCCH.

In aspect 28, the method of any of aspects 18-27 further includes that at least one of the PUSCH or the PUCCH is a PUSCH repetition or a PUCCH repetition.

In aspect 29, the method of any of aspects 18-28 further includes that the PUSCH repetition is associated with at least one of a PUSCH repetition Type A or a PUSCH repetition Type B.

In aspect 30, the aspect of any of aspects 18-29 further includes that the PUCCH is associated with at least one of a plurality of PUCCH formats.

In aspect 31, the aspect of any of aspects 18-30 further includes that the plurality of PUCCH formats includes at least one of PUCCH format 0, PUCCH format 1, PUCCH format 2, PUCCH format 3, or PUCCH format 4.

In aspect 32, the aspect of any of aspects 18-31 further includes that the network entity receives the at least one uplink channel with no phase continuity via more than one transmitting beam of the UE.

Aspect 33 is an apparatus for wireless communication including at least one processor coupled to a memory and configured to implement a method as in any of aspects 18 to 32.

Aspect 34 is an apparatus for wireless communication including means for implementing a method as in any of aspects 18 to 32.

Aspect 35 is a non-transitory computer-readable medium storing computer executable code, where the code when executed by a processor causes the processor to implement a method as in any of aspects 18 to 32.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
    a memory; and
    at least one processor coupled to the memory and configured to:
        receive, from a network entity, an indication of frequency hopping with zero frequency offset;
        determine whether phase continuity is to be applied to uplink (UL) transmissions based on the indication of the frequency hopping with the zero frequency offset; and
        transmit, to the network entity, at least one uplink channel with no phase continuity based on the determination to not apply the phase continuity to the UL transmissions.

2. The apparatus of claim 1, wherein the frequency hopping is associated with at least one of inter-slot frequency hopping or intra-slot frequency hopping.

3. The apparatus of claim 1, wherein the frequency hopping with the zero frequency offset is associated with the no phase continuity in the UL transmissions.

4. The apparatus of claim 1, wherein the at least one processor is further configured to:

receive, from the network entity, a configuration to not apply the phase continuity to the UL transmissions if the frequency hopping is with the zero frequency offset.

5. The apparatus of claim 1, wherein the indication is received with at least one of a schedule for the UL transmissions or control information for the frequency hopping.

6. The apparatus of claim 1, wherein the indication is received via at least one of radio resource control (RRC) signaling or downlink control information (DCI).

7. The apparatus of claim 6, wherein the indication received via the RRC signaling corresponds to a configured grant from the network entity and the indication received via the DCI corresponds to a dynamic grant from the network entity.

8. The apparatus of claim 1, wherein the at least one processor is further configured to:
determine, based on the determination to not apply the phase continuity to the UL transmissions, whether to apply an UL transmit beam switching for transmitting the at least one uplink channel; and
apply, based on the determination to apply the UL transmit beam switching for transmitting the at least one uplink channel, the UL transmit beam switching with the no phase continuity.

9. The apparatus of claim 8, wherein the at least one uplink channel is transmitted based on the applied UL transmit beam switching with the no phase continuity.

10. The apparatus of claim 1, wherein the at least one uplink channel is at least one of a physical uplink shared channel (PUSCH) or a physical uplink control channel (PUCCH).

11. The apparatus of claim 10, wherein at least one of the PUSCH or the PUCCH is a PUSCH repetition or a PUCCH repetition.

12. The apparatus of claim 11, wherein the PUSCH repetition is associated with at least one of a PUSCH repetition Type A or a PUSCH repetition Type B.

13. The apparatus of claim 10, wherein the PUCCH is associated with at least one of a plurality of PUCCH formats.

14. The apparatus of claim 13, wherein the plurality of PUCCH formats includes at least one of PUCCH format 0, PUCCH format 1, PUCCH format 2, PUCCH format 3, or PUCCH format 4.

15. A method for wireless communication at a user equipment (UE), comprising:
receiving, from a network entity, an indication of frequency hopping with zero frequency offset;
determining whether phase continuity is to be applied to uplink (UL) transmissions based on the indication of the frequency hopping with the zero frequency offset; and
transmitting, to the network entity, at least one uplink channel with no phase continuity based on the determination to not apply the phase continuity to the UL transmissions.

16. An apparatus for wireless communication at a network entity, comprising:
a memory; and
at least one processor coupled to the memory and configured to:
determine phase continuity is not to be applied to uplink (UL) transmissions from a user equipment (UE);
transmit, to the UE based on the determination, an indication of frequency hopping with zero frequency offset; and
receive, from the UE, at least one uplink channel with no phase continuity based on the indication of frequency hopping with the zero frequency offset.

17. The apparatus of claim 16, wherein the frequency hopping is associated with at least one of inter-slot frequency hopping or intra-slot frequency hopping.

18. The apparatus of claim 16, wherein the frequency hopping with the zero frequency offset is associated with the no phase continuity in the UL transmissions.

19. The apparatus of claim 16, wherein the at least one processor is further configured to:
transmit, to the UE, a configuration to not apply the phase continuity to the UL transmissions if the frequency hopping is with the zero frequency offset.

20. The apparatus of claim 16, wherein the indication is transmitted with at least one of a schedule for the UL transmissions or control information for the frequency hopping.

21. The apparatus of claim 16, wherein the indication is transmitted via at least one of radio resource control (RRC) signaling or downlink control information (DCI).

22. The apparatus of claim 21, wherein the indication transmitted via the RRC signaling corresponds to a configured grant and the indication transmitted via the DCI corresponds to a dynamic grant.

23. The apparatus of claim 16, wherein the at least one processor is further configured to:
determine, based on the determination that phase continuity is not to be applied to the UL transmissions, to not apply a joint channel estimation to one or more physical uplink shared channels (PUSCHs) or one or more physical uplink control channels (PUCCHs) received from the UE.

24. The apparatus of claim 23, wherein at least one of the one or more PUSCHs or the one or more PUCCHs is a PUSCH repetition or a PUCCH repetition.

25. The apparatus of claim 16, wherein the at least one uplink channel is at least one of a physical uplink shared channel (PUSCH) or a physical uplink control channel (PUCCH).

26. The apparatus of claim 25, wherein at least one of the PUSCH or the PUCCH is a PUSCH repetition or a PUCCH repetition.

27. The apparatus of claim 26, wherein the PUSCH repetition is associated with at least one of a PUSCH repetition Type A or a PUSCH repetition Type B.

28. The apparatus of claim 25, wherein the PUCCH is associated with at least one of a plurality of PUCCH formats that includes at least one of PUCCH format 0, PUCCH format 1, PUCCH format 2, PUCCH format 3, or PUCCH format 4.

29. The apparatus of claim 16, wherein the network entity receives the at least one uplink channel with the no phase continuity via more than one transmitting beam of the UE.

30. A method for wireless communication at a network entity, comprising:
determining phase continuity is not to be applied to uplink (UL) transmissions from a user equipment (UE);
transmitting, to the UE based on the determination, an indication of frequency hopping with zero frequency offset; and
receiving, from the UE, at least one uplink channel with no phase continuity based on the indication of frequency hopping with the zero frequency offset.

* * * * *